(12) United States Patent
Chu

(10) Patent No.: US 8,982,487 B2
(45) Date of Patent: Mar. 17, 2015

(54) LENS MODULE ASSEMBLING DEVICE

(71) Applicant: Hon Hai Precision Industry Co., Ltd., New Taipei (TW)

(72) Inventor: Chih-Hao Chu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/062,826

(22) Filed: Oct. 24, 2013

(65) Prior Publication Data
US 2014/0307342 A1 Oct. 16, 2014

(30) Foreign Application Priority Data
Apr. 10, 2013 (TW) ............................ 102112606 A

(51) Int. Cl.
G02B 7/02 (2006.01)
G02B 15/14 (2006.01)
G02B 27/62 (2006.01)

(52) U.S. Cl.
CPC ................ G02B 7/021 (2013.01); G02B 27/62 (2013.01)

USPC ............................ 359/827; 359/704; 359/819

(58) Field of Classification Search
USPC .................... 359/694–704, 811–830
See application file for complete search history.

(56) References Cited

U.S. PATENT DOCUMENTS

| | | | |
|---|---|---|---|
| 8,314,994 B1* | 11/2012 | Thomas et al. | 359/676 |
| 2004/0190160 A1* | 9/2004 | Nishimura | 359/699 |
| 2006/0072214 A1* | 4/2006 | Kawaguchi | 359/704 |
| 2009/0185296 A1* | 7/2009 | Huang et al. | 359/819 |

* cited by examiner

*Primary Examiner* — Mohammed Hasan
(74) *Attorney, Agent, or Firm* — Novak Druce Connolly Bove + Quigg LLP

(57) ABSTRACT

A lens assembling device is configured to assemble lenses into a lens barrel. The lens assembling device includes a hollow external barrel, a hollow internal barrel, and a pushing element. The external barrel includes a first hollow chamber and a second hollow chamber coaxial with the first hollow chamber. The first hollow chamber is configured to partly receive the lens barrel. The internal barrel is connected to the push element and is received in the second hollow chamber, and is configured to receive a lens. The pushing element is configured to push the lens from the internal barrel into the lens barrel.

10 Claims, 4 Drawing Sheets

LENS MODULE ASSEMBLING DEVICE

BACKGROUND

1. Technical Field

The present disclosure relates to assembling devices and, particularly, to a lens module assembling device.

2. Description of Related Art

A process of assembling a lens module includes steps: clamping a first lens through an iron tweezers; pushing the first lens into a lens barrel; clamping a second lens through the iron tweezers; and pushing the second lens into the lens barrel. However, using the iron tweezers to clamp the lenses repeatedly, carries the risk of a surface of the lenses being scratched and abraded when the iron tweezers and the lenses rub against each other. In addition, it is time-consuming and inefficient.

Therefore, it is desirable to provide a lens module assembling device which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
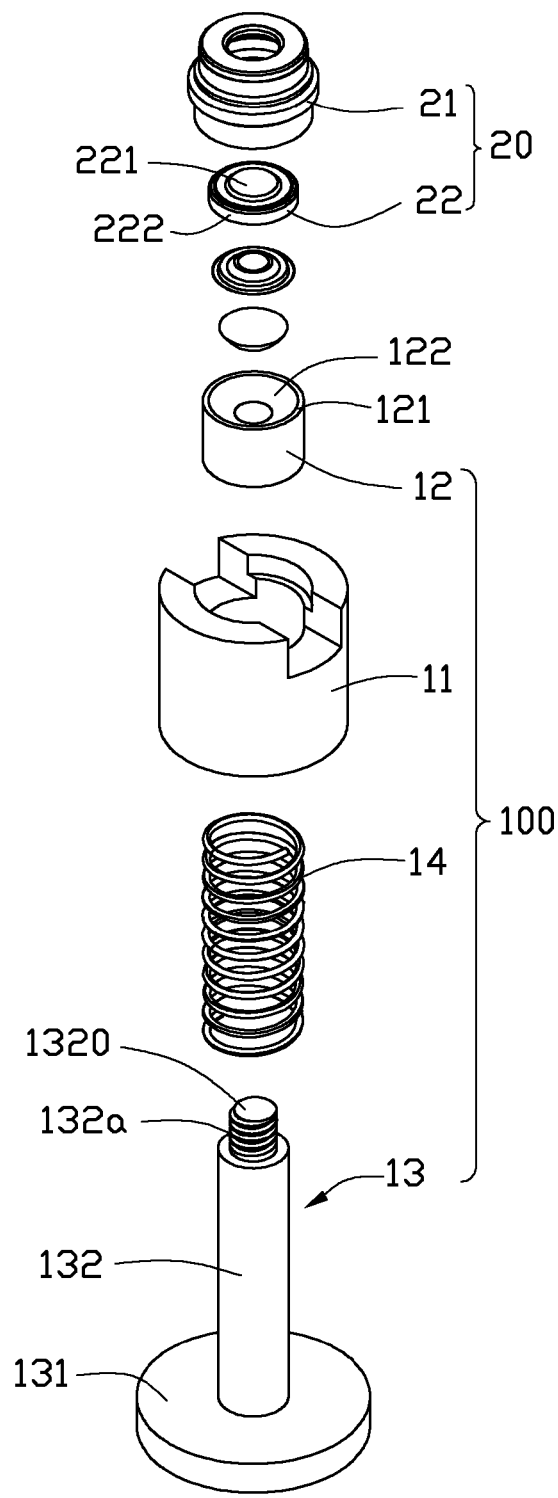
FIG. 1 is an exploded, isometric view of a lens module assembling device including a hollow external barrel, together with a lens module, according to an exemplary embodiment.
Figure 2:
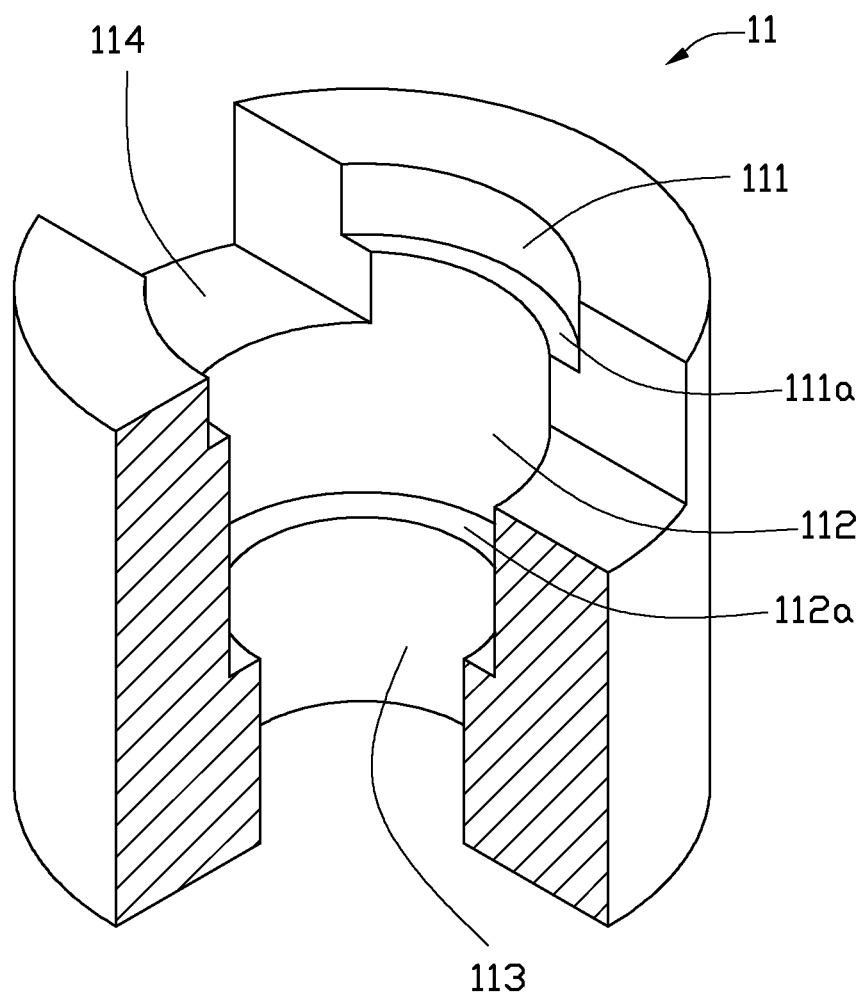
FIG. 2 is a cut-away view of the hollow external barrel of FIG. 1.
Figure 3:
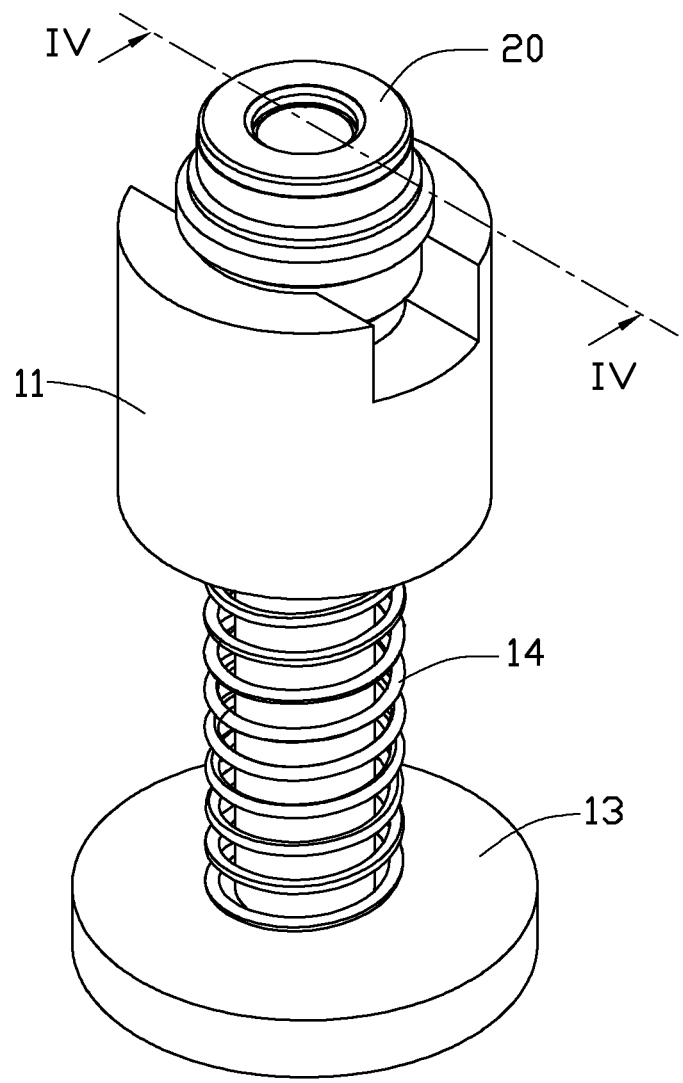
FIG. 3 is an assembled, isometric view of the lens module assembling device and the lens module of FIG. 1.
Figure 4:
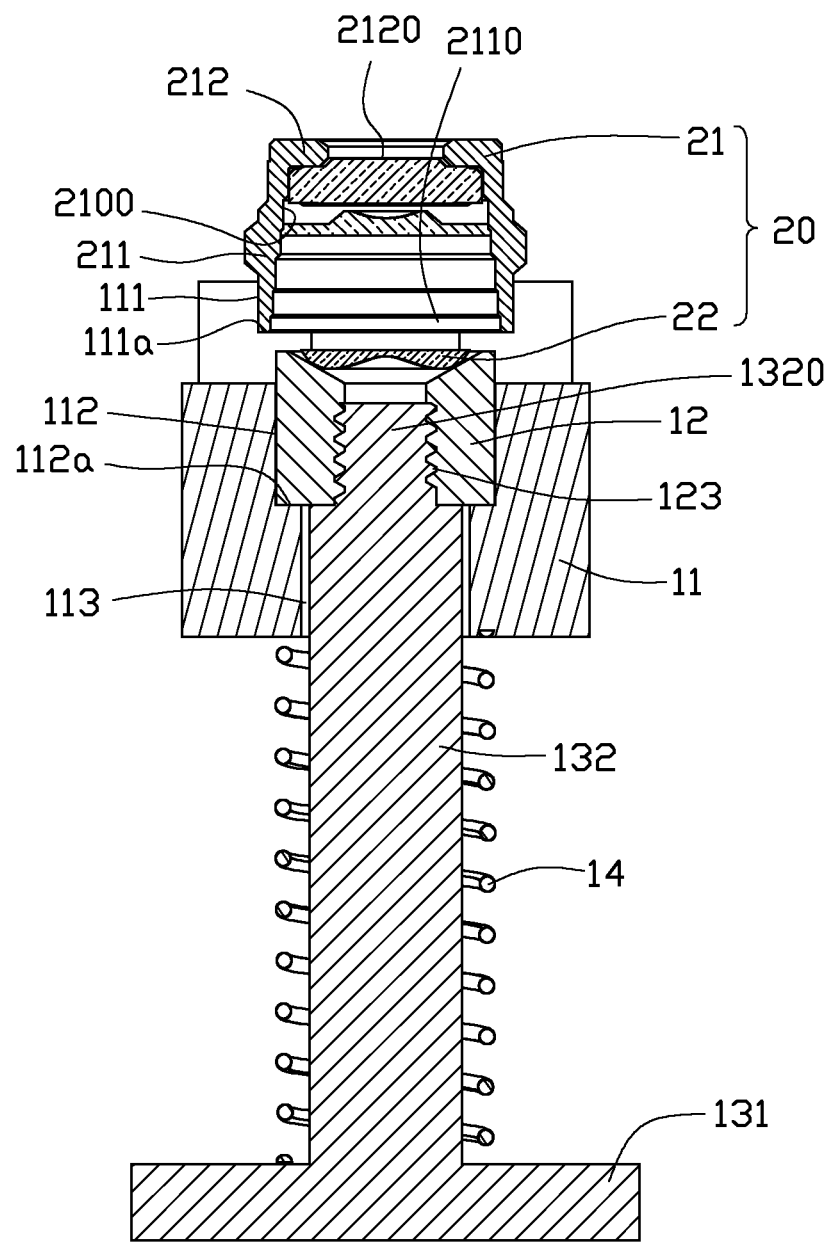
FIG. 4 is a cross-sectional view taken along line IV-IV of the lens module assembling device and the lens module of FIG. 3.

FIGS. 1-4 show a lens module assembling device 100 for assembling a lens module 20, according to an embodiment. In the illustrated embodiment, the lens module 20 includes a lens barrel 21 and three lenses 22 received in the lens barrel 21. The lens barrel 21 is a hollow cylinder in shape, and includes a main body 211 and an annular aperture plate 212. The annular aperture plate 212 is positioned at the object-side end of the main body 211 and is integrally formed with the main body 211. The image-side end of the main body 211 defines an entrance opening 2110 for assembling the three lenses 22 in the lens barrel 21. The annular aperture plate 212 defines an aperture opening 2120 at the center to allow light rays from objects of interest (not shown) to enter the lens barrel 21. Each lens 22 includes an imaging portion 221 and a non-imaging portion 222. The imaging portion 221 is configured for refracting light rays from an object and allowing them into the lens barrel 21. The non-imaging portion 222 surrounds the imaging portion 221 and is configured for fixing to an inner sidewall 2100 of the lens barrel 21.

The lens module assembly device 100 includes an external barrel 11, an internal barrel 12, a pushing element 13, and an elastic element 14.

The external barrel 11 is tubular, and includes a first hollow chamber 111, a second hollow chamber 112, and a third hollow chamber 113. The second hollow chamber 112 is sandwiched between the first hollow chamber 111 and the third hollow chamber 113. The first hollow chamber 111, the second hollow chamber 112, and the third hollow chamber 113 are coaxial with each other.

A diameter of the second hollow chamber 112 is slightly smaller than a diameter of the first hollow chamber 111, and is slightly larger than a diameter of the third hollow chamber 113. As such, a first step surface 111a is formed between the first hollow chamber 111 and the second hollow chamber 112, a second step surface 112a is formed between the second hollow chamber 112 and the third hollow chamber 113.

The size and shape of the first hollow chamber 111 respectively corresponds to the size and shape of the lens barrel 21, and is configured to partly receive the lens barrel 21, with the lens barrel 21 contacting with the first step surface 111a. The size and shape of the second hollow chamber 112 respectively correspond to the size and shape of the internal barrel 12. The second hollow chamber 112 is configured to partly receive the internal barrel 12, with the internal barrel 12 contacting with the second step surface 112a. As the first hollow chamber 111, the second hollow chamber 112, and the third hollow chamber 113 being coaxial with each other that the lens barrel 21 and the internal barrel 12 are coaxial with each other.

The external barrel 11 defines two openings 114. A thickness of the two openings 114 in a direction parallel to an optical axial of the lens module 20 is slightly larger than a thickness of the first hollow chamber 111, as such, it is convenient for user to take out the lens barrel 21 from the external barrel 11.

The internal barrel 12 is tubular, and a diameter of the internal barrel 12 is slightly smaller than a diameter of the entrance opening 2110. A thickness of the internal barrel 12 in a direction parallel to an optical axial of the lens module 20 is slightly larger than or substantially equal to a thickness of the lens barrel 21, this can prevent the internal barrel 12 from sliding out of the second hollow chamber 112. The internal barrel 12 is configured to hold a lens 22. In particular, the internal barrel 12 includes a circular supporting surface 121 and a sloped surface 122 extending from the supporting surface 121 toward a center of the internal barrel 12. The sloped surface 122 is integrally formed with the internal barrel 12. The supporting surface 121 supports the non-imaging portion 222 of the lens 22, with the imaging portion 221 supported on the sloped surface 122. To prevent the lens 22 from being scratched and abraded, the internal barrel 12 is made of rubber.

The pushing element 13 is configured to push the lens 22 received in the internal barrel 12 into the lens barrel 21. The pushing element 13 includes a base 131 and a resisting post 132. The resisting post 132 substantially perpendicularly extends from and integrally formed with the base 131. A free end 1320 of the resisting post 132 is configured to push the internal barrel 12 into the lens barrel 21. In particular, the free end 1320 defines external threads 132a. An internal sidewall of the internal barrel 12 defines internal threads 123. A diameter of the free end 1320 is slightly smaller than or substantially equal to a diameter of the third hollow chamber 113. The free end of the resisting post 132 passes through the third hollow chamber 113 and is connected to the internal barrel 12 through the external threads 132a threadedly engaging with the internal threads 123.

In the embodiment, the elastic element 14 is a spring, which is coiled around the resisting post 132. Two ends of the elastic element 14 are respectively resisted against the base 131 and the external barrel 11.

In assembly, first, coating an adhesive (not shown) onto an inner sidewall 2100 of the lens barrel 21 and assembling a lens 22 into the internal barrel 12. Following, receiving lens barrel 21 into the first hollow chamber 111, with the entrance opening 2110 aligning with the internal barrel 12. Then, providing a pressure onto the lens barrel 21 to push down the lens barrel 21, until the lens 22 received in the internal barrel 12 is set on a predetermined positioned in the inner sidewall 2100 of the lens barrel 12, the adhesive fixedly bonds the lens 22 onto the inner sidewall 2100, and then, releasing the pressure, the external barrel 12 rebounds back to an original position through the elastic element 14. Finally, repeating the above steps to assemble another two lens 22 into the lens barrel 21.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A lens module assembling device for assembling lenses into a lens barrel, the lens assembling device comprising:
   a hollow external barrel comprising a first hollow chamber and a second hollow chamber coaxial with the first hollow chamber, the first hollow chamber configured to partly receive the lens barrel;
   a hollow internal barrel partly received in the second hollow chamber, and configured to receive a lens, and
   a pushing element connected to the internal barrel, and configured to push the lens from the internal barrel into the lens barrel;
   wherein the size and shape of the first hollow chamber respectively correspond to the size and shape of the lens barrel, a diameter of the second hollow chamber is slightly smaller than a diameter of the first hollow chamber, the internal barrel comprises a first step surface formed between the first hollow chamber and the second hollow chamber, the lens barrel makes contact with the first step surface when the lens barrel is partly received in the first hollow chamber.

2. The lens module assembling device of claim 1, wherein the external barrel defines two opening.

3. The lens module assembling device of claim 2, wherein a thickness of the two opening in a direction parallel to an optical axial of the lens module is slightly larger than a thickness of the first hollow chamber.

4. The lens module assembling device of claim 1, wherein the internal barrel comprises a circular supporting surface and a sloped surface extending from the supporting surface toward a center of the internal barrel.

5. The lens module assembling device of claim 1, wherein the internal barrel is made of rubber.

6. A lens module assembling device for assembling lenses into a lens barrel, the lens assembling device comprising:
   a hollow external barrel comprising a first hollow chamber and a second hollow chamber coaxial with the first hollow chamber, the first hollow chamber configured to partly receive the lens barrel;
   a hollow internal barrel partly received in the second hollow chamber, and configured to receive a lens, and
   a pushing element connected to the internal barrel, and configured to push the lens from the internal barrel into the lens barrel, wherein the external barrel comprises a third hollow chamber, the second hollow chamber is sandwiched between the first hollow chamber and the third hollow chamber, the first hollow chamber, the second hollow chamber, and the third hollow chamber are coaxial with each other, a diameter of the second hollow chamber is slightly larger than a diameter of the third hollow chamber, a second step surface is formed between the second hollow chamber and the third hollow chamber, the internal barrel contacts with the second step surface.

7. The lens module assembling device of claim 6, wherein the pushing element comprises a base and a resisting post, the resisting post substantially perpendicularly extends from and integrally formed with the base, the resisting post passes through the third hollow chamber, and is connected to the internal barrel.

8. The lens module assembling device of claim 7, wherein the resisting post comprises a free end, the free end defines external threads, the internal barrel defines internal threads, a diameter of the free end is slightly smaller than or substantially equal to a diameter of the third hollow chamber, the free end of the resisting post passes through the third hollow chamber and is connected to the internal barrel through the external threads threadedly engaging with the internal threads.

9. The lens module assembling device of claim 7, comprising an elastic element, wherein the elastic element is coiled around the resisting post, and two ends of the elastic element are respectively resisted against the base and the external barrel.

10. The lens module assembling device of claim 9, wherein the elastic element is a spring.

* * * * *